United States Patent
Takasugi et al.

(10) Patent No.: US 6,745,263 B2
(45) Date of Patent: Jun. 1, 2004

(54) AUTOMATED MULTIPLE DATA UNIT TRANSFERS BETWEEN A HOST DEVICE AND A STORAGE MEDIUM

(75) Inventors: Robin Alexis Takasugi, Eagle, ID (US); Stewart R. Wyatt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 10/091,739

(22) Filed: Mar. 6, 2002

(65) Prior Publication Data

US 2003/0172207 A1 Sep. 11, 2003

(51) Int. Cl.[7] .............................................. G06F 13/00
(52) U.S. Cl. ............................ 710/52; 710/36; 710/53; 710/55; 710/56
(58) Field of Search ............................. 710/36, 52, 53, 710/55, 56

(56) References Cited

U.S. PATENT DOCUMENTS

| | | | | |
|---|---|---|---|---|
| 5,121,480 A | * | 6/1992 | Bonke et al. ................... 711/2 |
| 5,634,099 A | * | 5/1997 | Andrews et al. ............ 709/212 |
| 5,832,308 A | * | 11/1998 | Nakamura et al. ............ 710/53 |
| 6,151,641 A | * | 11/2000 | Herbert ........................ 710/22 |
| 6,438,629 B1 | * | 8/2002 | Huebner et al. ............... 710/52 |

* cited by examiner

*Primary Examiner*—Jeffrey Gaffin
*Assistant Examiner*—Mohammad O. Farooq

(57) ABSTRACT

Systems and methods for transferring data between a host device and a storage medium are provided. In one implementation, a system for transferring data between a host device and a storage medium includes a host interface that receives from a host device a command to transfer data between the host device and the storage medium, a buffer that temporarily stores data that is transferred between the host device and the storage medium, a first register that stores a value for tracking a number of data units that are transferred between the buffer and the storage medium, and a second register that stores a value for tracking a number of data units that are transferred between the host device and the buffer. A data unit is transferred between the buffer and the storage medium if the value in the first register is within a predetermined range. Similarly, a data unit is transferred between the buffer and the host device if the value in the second register is within a predetermined range.

16 Claims, 12 Drawing Sheets

AUTOMATED MULTIPLE DATA UNIT TRANSFERS BETWEEN A HOST DEVICE AND A STORAGE MEDIUM

FIELD OF THE INVENTION

The present invention relates to data transfers between a host device and a storage medium.

BACKGROUND OF THE INVENTION

Memory controllers are used for transferring data between a host device and a non-volatile semiconductor memory device. Host device interface protocols typically allow the host device to request the transfer of multiple units of data to or from the semiconductor memory device using a single command. The intervention of a memory controller microprocessor is usually required to configure the semiconductor device controller for the transfer and to initiate the transfer. A single data transfer cycle between the host device and the memory device is referred to as a data phase. The completion of a host device's request to transfer data may involve multiple data phases.

After the implementation of each data phase of a multi-phase request, microprocessor intervention has been traditionally required to signal data phase termination to the host and, if applicable, to initiate the transfer of subsequent data phases. Since each read or write operations may comprise a large number of data phases, such read or write operation may require a large number of microprocessor interventions. Performing a large number of microprocessor interventions is time consuming and can therefore increase the time needed to complete a read or write operation in connection with the memory device. This problem may be alleviated by employing a faster microprocessor. Such a solution, however, may not be very cost effective. Therefore there exists a need for systems and methods for solving these and other problems associated with transferring data between a host device and a memory device.

SUMMARY OF THE INVENTION

The present invention relates to systems and methods for transferring data between a host device and a storage medium. In this regard, an embodiment of one such method includes receiving from a host device a command to transfer data between the host device and the storage medium, storing in a first register a value for tracking a number of data units that are transferred between a buffer and the storage medium, and storing in a second register a value for tracking a number of data units that are transferred between the host and the buffer.

An embodiment of a system for transferring data between a host device and a storage medium includes a host interface that receives from a host device a command to transfer data between the host device and the storage medium, a buffer that temporarily stores data that is transferred between the host device and the storage medium, a first register that stores a value for tracking a number of data units that are transferred between the buffer and the storage medium, and a second register that stores a value for tracking a number of data units that are transferred between the host device and the buffer.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

Figure 1:
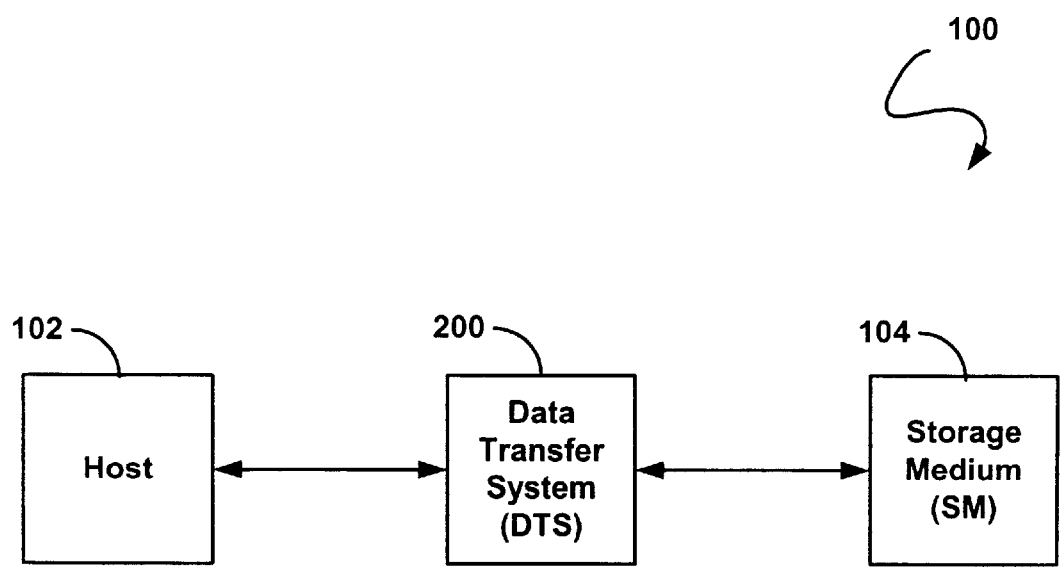
FIG. 1 is a block diagram of a computer network 100 in accordance with one embodiment of the present invention.

FIG. 1 is a block diagram of a computer network 100 in accordance with one embodiment of the present invention. The computer network 100 comprises a host 102 and a storage medium (SM) 104 that are coupled to a data transfer system (DTS) 200. The Data Transfer System 200 facilitates read and write data transfers between the host 102 and the Storage Medium 104. For example, in a write operation, data is transferred from the host 102 to the Storage Medium 104 via the Data Transfer System 200. Similarly, in a read operation, data is transferred from the Storage Medium 104 to the host 102 via the Data Transfer System 200. A single data transfer cycle between the host device and the memory device is referred to as a data phase. The completion of a host device's request to transfer data may involve multiple data phases. The host 102 is a data processing system such as, for example, a desktop computer, a notebook computer, a personal digital assistant (PDA), or a mainframe computer, among others. The Storage Medium 104 is a non-volatile semiconductor memory device such as, for example, flash memory, non-volatile random access memory (non-volatile RAM), or electrically erasable programmable read only memory (EEPROM).

Figure 2:
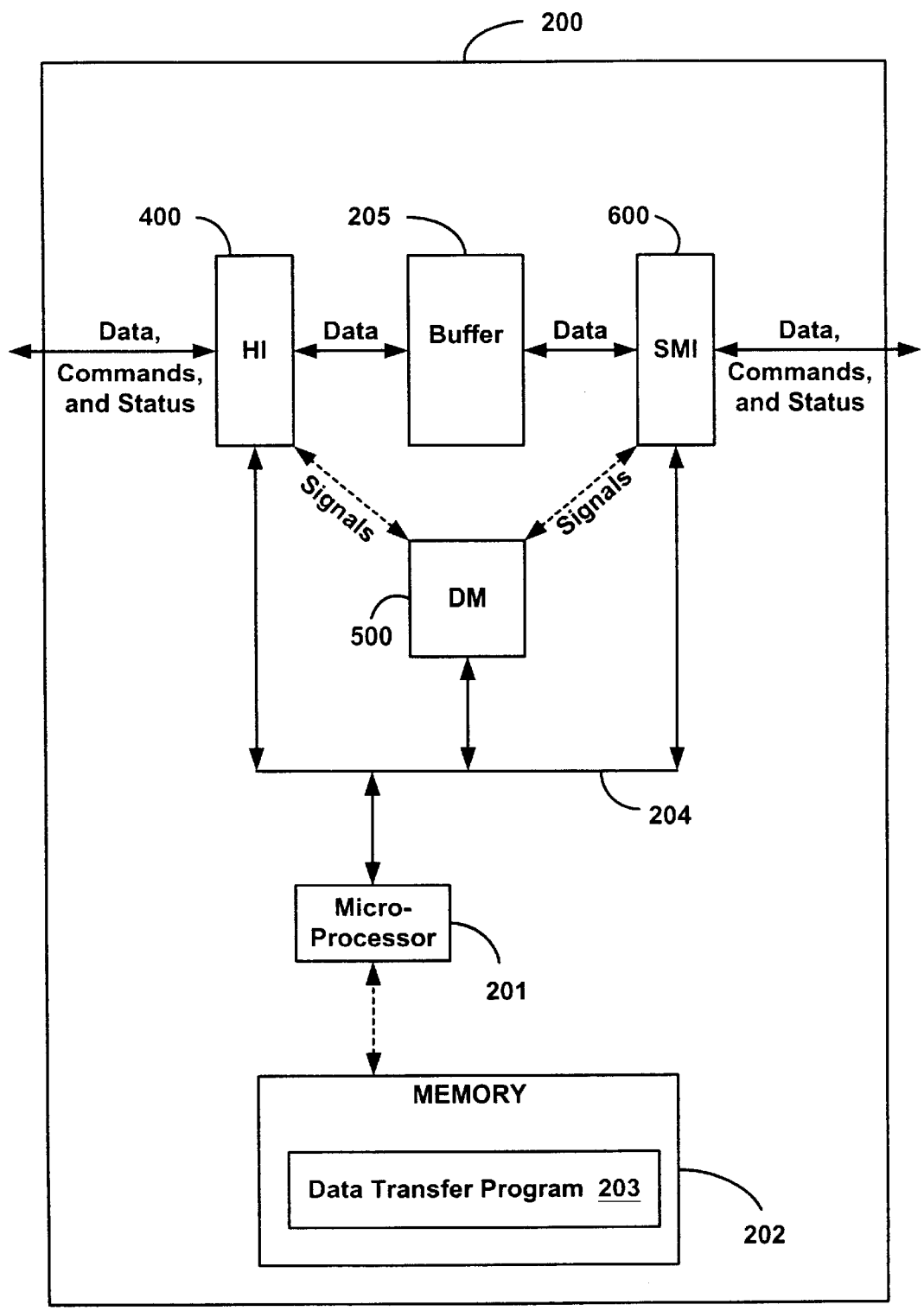
FIG. 2 is a block diagram depicting an embodiment of the data transfer system depicted in FIG. 1.

FIG. 2 is a block diagram depicting one embodiment of the Data Transfer System 200 (FIG. 1). The Data Transfer System 200 includes a data mover (DM) module 500, a host interface (HI) module 400, a storage medium interface (SMI) module 600, a buffer 205 (preferably a circular buffer), a microprocessor 201, memory 202, and a bus 204. As indicated in FIG. 2, the components of the Data Transfer System 200 may be coupled as follows: the Data Mover 500 is coupled to the Host Interface 400 and to the Storage Medium Interface 600; the Host Interface 400 is coupled to a host 102 (FIG. 1); the Storage Medium Interface 600 is coupled to a Storage Medium 104 (FIG. 1); the microprocessor 201 is coupled to the memory 202; and the Host Interface 400, the Data Mover 500, and the Storage Medium Interface 600 are coupled to the microprocessor 201 via the bus 204. The Data Mover 500 organizes and controls the flow of data between the host 102 and the Storage Medium 104. The buffer 205 is used to buffer data being transferred between the host 102 and the Storage Medium 104. The memory 202 is used for storing a data transfer program 203 that is executed by a microprocessor 201 to control the operation of the Host Interface 400, the Data Mover 500, and the Storage Medium Interface 600. In a preferred embodiment, the memory 202 comprises random access memory (RAM) and read only memory (ROM), and the data transfer program 203 comprises firmware. The buffer 205, the Host Interface 400, the Data Mover 500, the Storage Medium Interface 600, the microprocessor 201, the memory 202, and the bus 204 are preferably, but not necessarily, part of a single application specific integrated circuit (ASIC).

Figure 3:
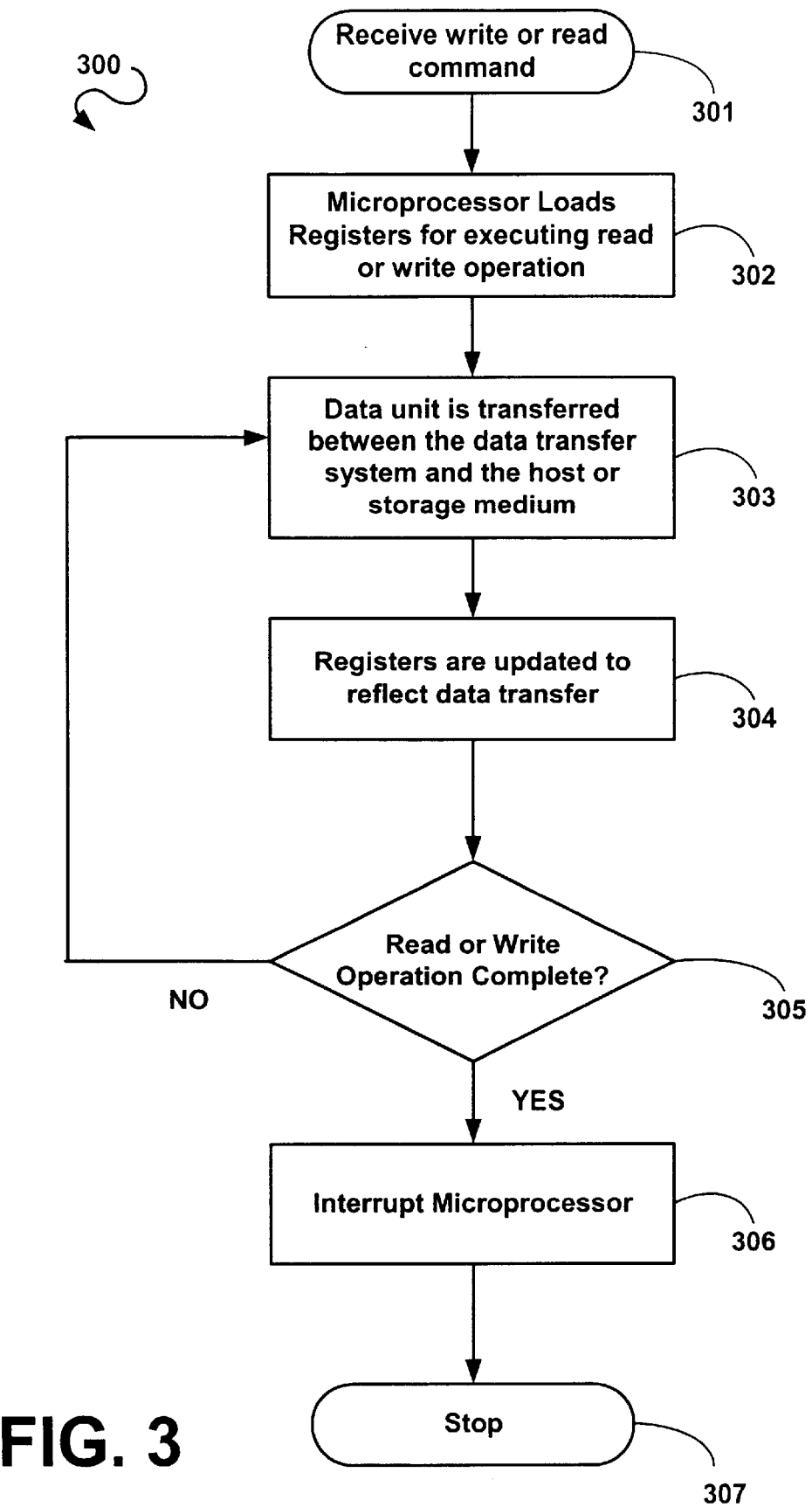
FIG. 3 is a flow chart depicting a method that may be implemented by the data transfer system depicted in FIG. 2.

FIG. 3 depicts a flow chart that illustrates a method 300 that may be implemented by the Data Transfer System 200 (FIG. 2) in accordance with one embodiment of the invention. In step 301, the Data Transfer System 200 receives a read or write command from the host 102 (FIG. 1) requesting a read or write operation, respectively. In response to receiving the command, the microprocessor 201 (FIG. 2) loads registers in the Host Interface 400, the Data Mover 500, and the Storage Medium Interface 600 (FIG. 2) for executing the read or write operation requested by the command. In a read operation, data is transferred from the Storage Medium 104 (FIG. 1) to the host 102. During a write operation, data is transferred from the host 102 to the Storage Medium 104. After the registers are loaded in step 302, a data unit (e.g., a block or a sector of data) is transferred between the Data Transfer System 200 and the host 102 or the Storage Medium 104, as indicated in step 303. The data transfer is coordinated and managed by the Host Interface 400, the Data Mover 500, and/or the Storage Medium Interface 600. Data that is transferred between the host 102 and the Storage Medium 104 is buffered in the buffer 205 of the Data Transfer System 200. In one implementation of the method 300, a data unit that is transferred between the buffer 205 and the host 102 is a block of data that may comprise multiple sectors, whereas a data unit that is transferred between the buffer 205 and the storage medium 104 is a sector (e.g. 512 bytes). Data is preferably transferred between the Data Transfer System 200 and the host 102 in units of bytes (8 bits) or words (16 bits), and between the Data Transfer System 200 and the storage medium 104 in units of bytes. After each unit of data is transferred between the Data Transfer System 200 and the host 102 or the Storage Medium 104, registers in the Host Interface 400, the Data Mover 500, and/or the Storage Medium Interface 600 are updated in step 304 to reflect the occurrence of the data transfer. After the registers are updated, a determination is made by the data mover 500 in step 305 as to whether the entire read or write operation requested by the read or write command, respectively, is complete. If the entire read or write operation is complete, then the microprocessor 201 is interrupted in step 306, and the method 300 terminates in step 307. If, however, the read or write operation is not complete, then the method 300 repeats steps 303–305 until the read or write operation is complete.

Figure 4:
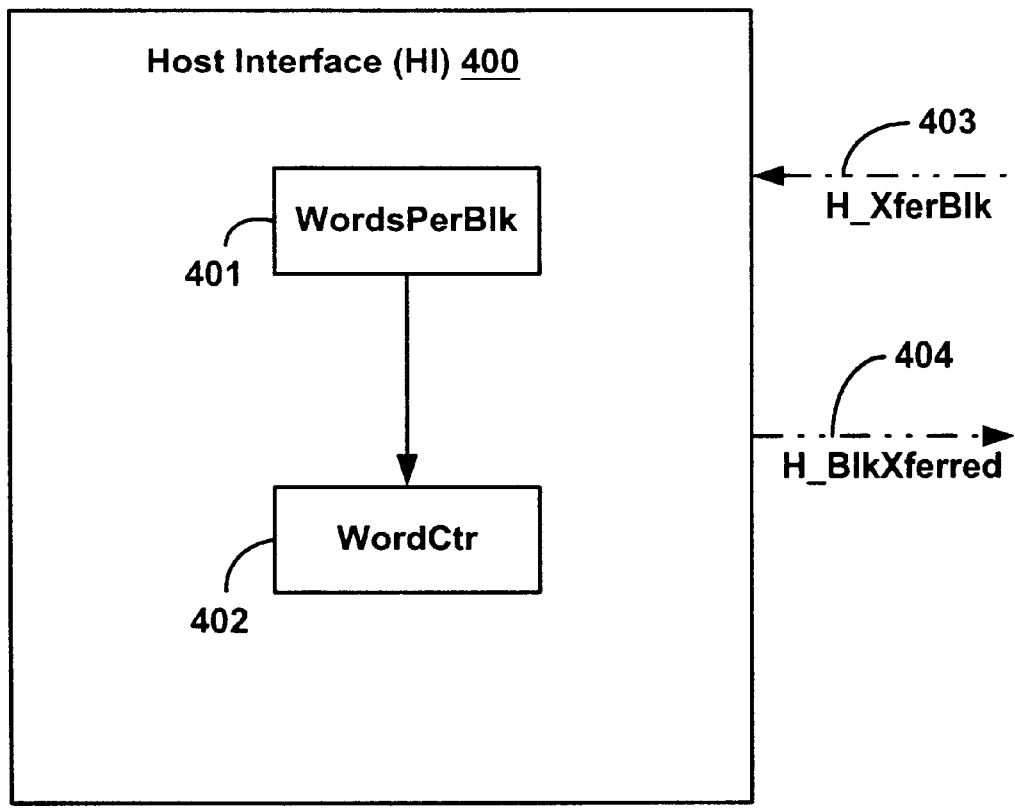
FIG. 4 is a block diagram depicting an embodiment of the host interface of the data transfer system depicted in FIG. 2.

FIG. 4 is a block diagram illustrating selected components of the Host Interface 400 of the Data Transfer System 200 (FIG. 2) in accordance with one embodiment of the present invention. The Host Interface 400 interfaces with the host 102 (FIG. 1) and facilitates data transfers between the host 102 and the buffer 205 (FIG. 2). The Host Interface 400 and the Data Mover 500 (FIG. 5) transmit signals to each other in order to indicate their respective status and their readiness to perform a certain step. For instance, an H_XferBlk signal 403 from the Data Mover 500 to the Host Interface 400 indicates that the buffer 205 is ready to provide or receive data to/from the host 102. On the other hand, an H_BlkXferred signal 404 from the Host Interface 400 to the Data Mover 500 indicates that a block of data has been transferred between the buffer 205 and the host 102.

The Host Interface 400 includes a WordsPerBlk register 401 that is loaded at the beginning of a read or write operation with the number of words per block of data. A WordCtr register 402 is used for counting down the number of words transferred during each block transfer. Prior to each block transfer, the WordCtr register 402 is loaded by receiving a value contained in the WordsPerBlk register 401. In an alternative embodiment, the WordsPerBlk register 401 is loaded with the number of longwords per block of data, and the WordCtr register 402 is used for counting down the number of longwords transferred during each block transfer.

Figure 5:
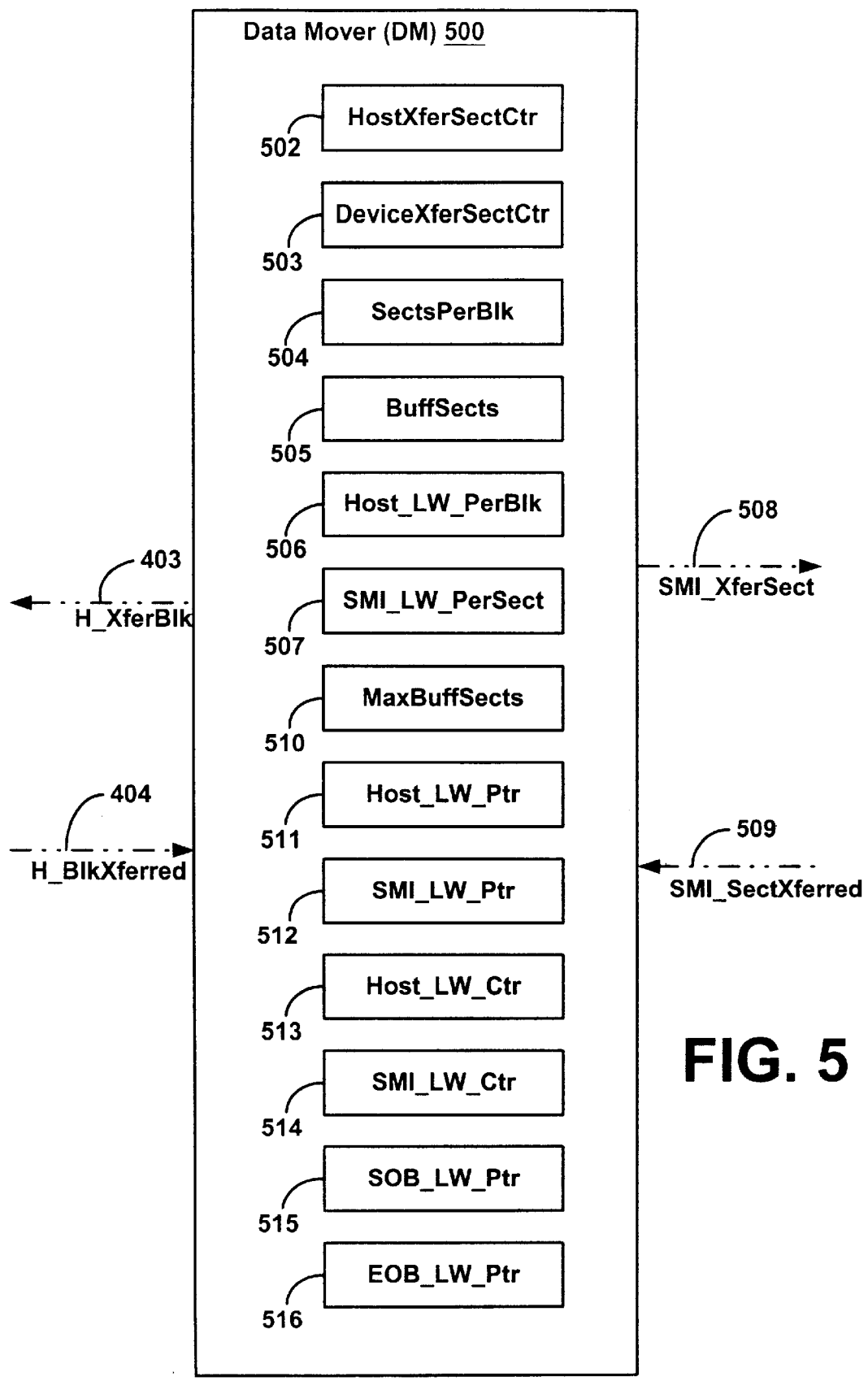
FIG. 5 is a block diagram depicting an embodiment of the data mover of the data transfer system depicted in FIG. 2.

FIG. 5 is a block diagram depicting selected components of the Data Mover 500 in accordance with one embodiment of the present invention. The Data Mover 500 includes registers containing information as described in the following table:

TABLE 1

Registers that may be included in the Data Mover 500

| REGISTER NAME | CONTENT/DESCRIPTION |
| --- | --- |
| Host_LW_Ptr 511 | Data buffer 205 long word address for transfers to/from host 102 |
| Host_LW_Ctr 513 | Long word counter for transfers to/from host 102 |
| Host_LW_PerBlk 506 | The number of long words per block of data |
| HostXferSectCtr (HXSC) 502 | Counts number of sectors to be transferred to/from host 102 |
| SectsPerBlk (SPB) 504 | Number of sectors per block of data |
| SOB_LW_Ptr 515 | Start address of buffer 205 |
| EOB_LW_Ptr 516 | End address of buffer 205 |
| SMI_LW_Ptr 512 | Data buffer 205 long word address for transfers to/from Storage Medium 104 |
| SMI_LW_Ctr 514 | Long word counter for transfers to/from Storage Medium 104 |
| SMI_LW_PerSect 507 | The number of long words per sector. |
| BuffSects 505 | Number of sectors in the buffer 205 |
| MaxBuffSects 510 | Size of the buffer 205 |
| DeviceXferSectCtr (DXSC) 503 | Counts number of sectors to be transferred to/from Storage Medium 104 |

The registers identified in Table 1 are used by the Data Mover 500 to manage the transfer of data between the host 102 and the Storage Medium 104. A data transfer between the host 102 and the Storage Medium 104 is initiated in response to the Host Interface 400 receiving a read or write command from the host 102. After the Host Interface 400 receives a read or write command from the host 102, the Host Interface 400 interrupts the microprocessor 201 which loads certain registers of the modules Host Interface 400, Data Mover 500, and Storage Medium Interface 600 and then activates them (the modules 400, 500, and 600). After being activated, the Data Mover 500 sends a request for a block of data to the Host Interface 400 (for a write operation) or a request for a sector of data to the Storage Medium Interface 600 (for a read operation). A request for a block from the Host Interface 400 is achieved by sending an H_XferBlk 403 signal to the Host Interface 400, whereas a request for a sector from the Storage Medium Interface 600 is achieved by sending an SMI_XferSect 508 signal to the Storage Medium Interface 600.

For a read operation, if there is room in the data transfer buffer 205 and if the value of DXSC 503 is greater than 0, then the Data Mover 500 requests that a sector of data be transmitted from the Storage Medium 104 to the buffer 205. The Data Mover 500 performs this request by sending an SMI_XferSect 508 signal to the Storage Medium Interface 600. The Data Mover 500 also tracks the progress of the sector transfer by managing the DXSC 503, which the Data Mover 500 decrements by 1 after each successful sector transfer from the Storage Medium 104 to the buffer 205. Eventually the DXSC 503 will go to 0, and the Data Mover 500 will stop transmitting data transfer requests to the Storage Medium Interface 600. Similarly, for a write operation, as long as there is room in the data transfer buffer 205 and the value of HXSC is greater than the value of SPB 504, the Data Mover 500 hardware will continue to request that a block of data be transmitted from the host 102 to the buffer 205 by sending an H_XferBlk signal to the Host Interface 400. The Data Mover 500 will also track the progress of the transfer by managing the HXSC 502, which is decremented by the value of SPB after each successful block transfer from the host 102 to the buffer 205. Eventually the HXSC 502 will go to 0, and the Data Mover 500 will stop transmitting data transfer requests to the Host Interface 400.

Data transfers between the data transfer buffer 205 and the Host Interface 400 or Storage Medium Interface 600 are preferably in units of longwords (e.g., 4 bytes). As each longword is transferred, Data Mover 500 hardware decrements either the Host_LW_Ctr 513 or the SMI_LW_Ctr 514 depending on whether the transfer is to/from the host 102 or the Storage Medium 104. In addition, word counters internal to the Host Interface 400 and Storage Medium Interface 600 are decremented. At the end of a sector transfer to/from the Storage Medium 104, the Storage Medium Interface 600's internal word counter goes to 0, prompting it to send the sector acknowledgment SMI_SectXferred 509 to the Data Mover 500, which is expecting this signal because its own SMI_LW_Ctr 514 has gone to 0. If there are more sectors to be transferred (i.e., if the value of DXSC 503 is greater than 0), then upon receipt of the SMI_SectXferred 509 signal, the Data Mover 500 hardware reloads the SMI_LW_Ctr 514 from the register SMI_LW_PerSect 507 and issues another SMI_XferSect 508 signal to the Storage Medium Interface 600. Similarly, at the end of a block transfer to/from the host 102, the internal word counter WordCtr 402 of the Host Interface 400 goes to 0, prompting the Host Interface 400 to send the block acknowledgment Host_BlkXferred 404 to the Data Mover 500 which is expecting this signal because its Host_LW_Ctr 513 has also gone to 0. If there are more blocks to be transferred, then upon receipt of the Host_BlkXferred 404 signal, the Data Mover 500 hardware reloads the Host_LW_Ctr 513 from the register Host_LW_PerBlk 506 and issues another Host_XferBlk 403 signal to the Host Interface 400.

Figure 6:
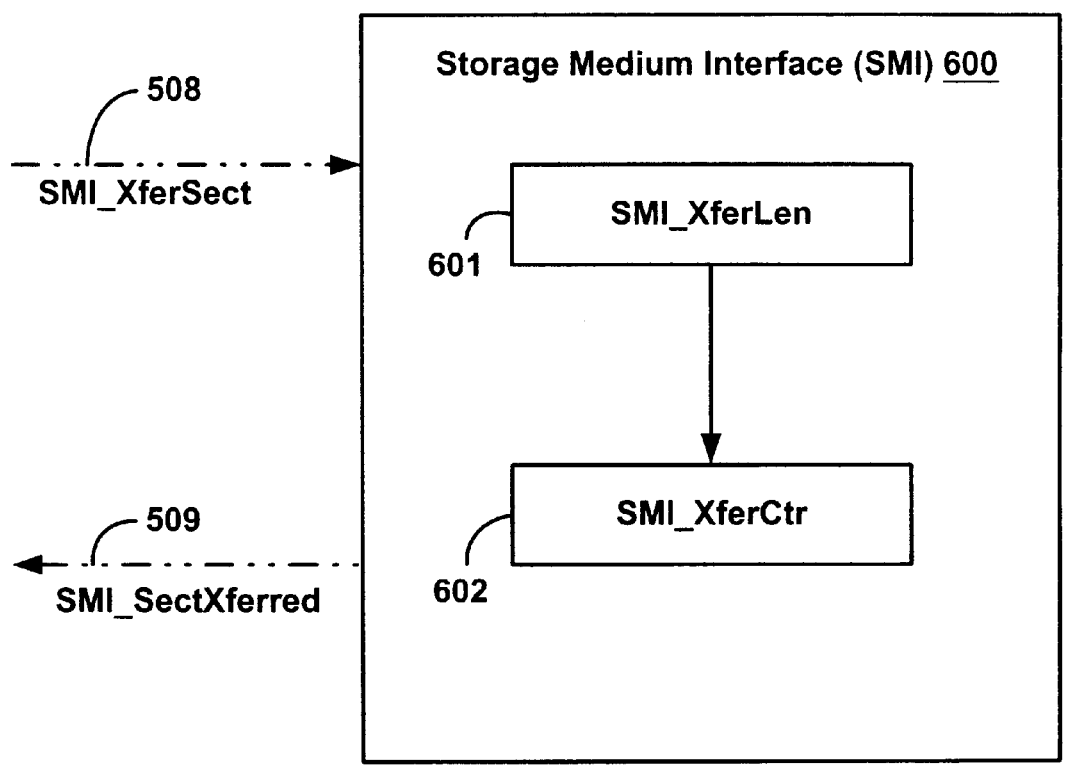
FIG. 6 is a block diagram depicting an embodiment of the storage medium interface of the data transfer system depicted in FIG. 2.

FIG. 6 is a block diagram illustrating selected components of the Storage Medium Interface 600 of the Data Transfer System 200 (FIG. 2) in accordance with one embodiment of the present invention. The Storage Medium Interface 600 interfaces with Storage Medium 104 (FIG. 1) and transfers data between the buffer 205 (FIG. 2) and the Storage Medium 104 in response to receiving an SMI_XferSect signal 508 from the Data Mover 500. After the Storage Medium Interface 600 transfers a sector of data between the buffer 205 and the Storage Medium 104, it transmits an SMI_SectXferred signal 509 to the Data Mover 500 confirming the data transfer. Registers contained in the Storage Medium Interface 600 include an SMI_XferLen register 601 that indicates the number of data sectors to be transferred and an SMI_XferCtr register 602 that counts down the number of sectors transferred. The SMI_XferCtr register 602 is loaded with the value contained in the SMI_XferLen register 601 prior to each read or write operation.

Figure 7A:
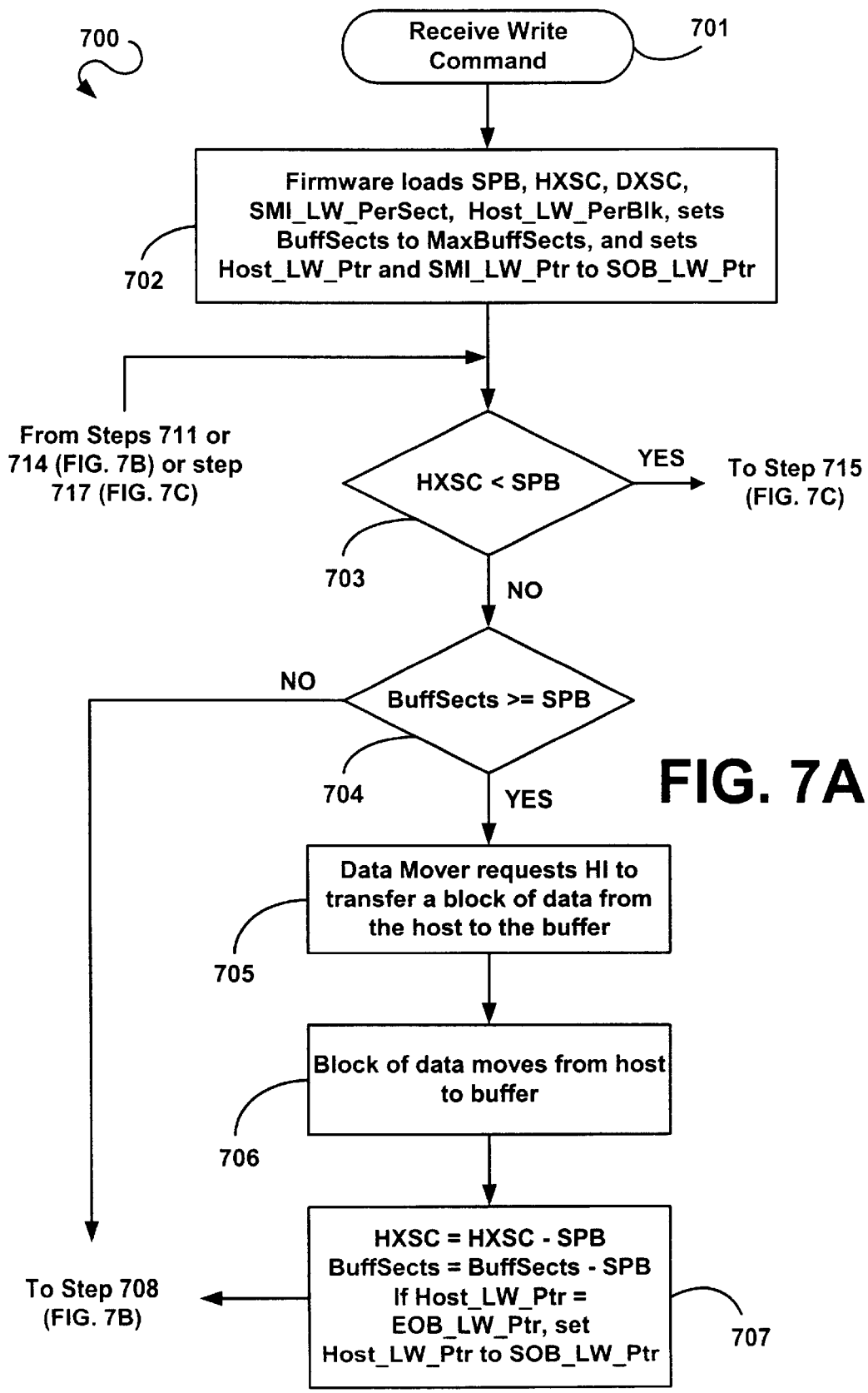
FIGS. 7A, 7B, and 7C are flow charts depicting a non-limiting example of a method for writing data to the storage medium depicted in FIG. 1 in accordance with an embodiment of the present invention.
Figure 7B:
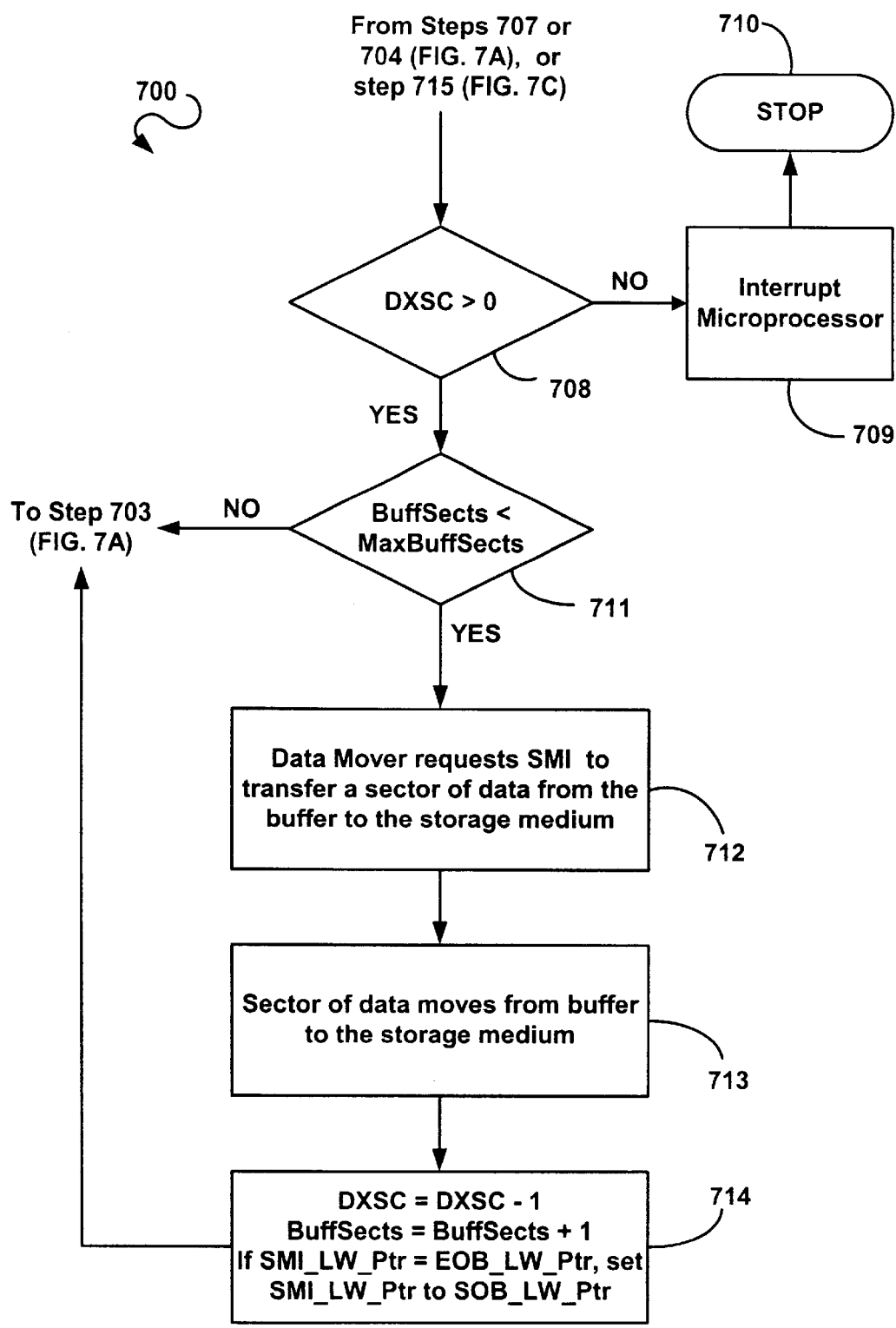
Figure 7C:
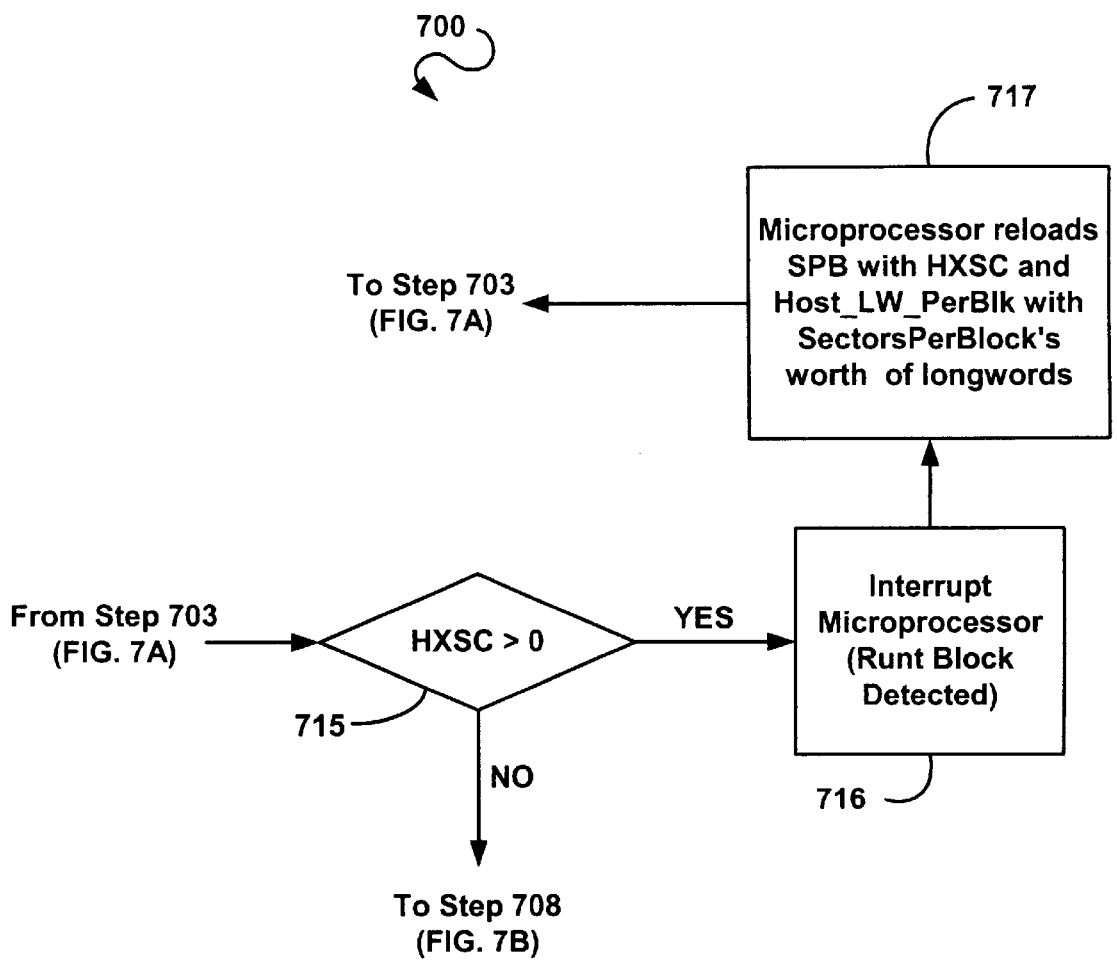

With additional reference to FIG. 5 throughout the remaining figure descriptions, FIGS. 7A, 7B, and 7C are flow charts depicting a non-limiting example of a write method that is performed by the Data Transfer System 200 (FIG. 2) in accordance with one embodiment of the present invention. In step 701, the Host Interface 400 (FIG. 2) receives a write command from a host 102 (FIG. 1). In response to receiving the write command, the Host Interface 400 interrupts the Microprocessor 201 (FIG. 2) which, in step 702, loads the number of sectors per block into SectsPerBlk (SPB 504), the transfer length in sectors into HostXferSectCtr (HXSC 502) and DeviceXferSectCtr (DXSC 503), the number of longwords in a sector into SMI_LW_PerSect 507, and the number of longwords in a block into Host_LW_PerBlk 506. In addition, the Microprocessor 201 sets BuffSects 505 to MaxBuffSects 510, sets Host_LW_Ptr 511 and SMI_LW_Ptr 512 to SOB_LW_Ptr 515, and then activates the modules Host Interface 400, Data Mover 500, and Storage Medium Interface 600 (FIG. 2).

Subsequently, in step 703, the Data Mover 500 determines if the amount of data remaining to be transferred is less than a block's worth of data; this determination is based on whether the value of HXSC 502 is less than the value of SPB 504. If the value of HXSC 502 is less than the value of SPB 504, then the method 700 proceeds to step 715 (FIG. 7C). If, however, the value of HXSC 502 is not less than the value of SPB 504, then the Data Mover 500 determines in step 704 if there is at least 1 block's worth of available storage in the buffer 205; this determination is based on whether the value of BuffSects 505 is greater than or equal to the value of SPB 504. If the value of BuffSects 505 is not greater than or equal to the value of SPB 504, then the method 700 proceeds to step 708 (FIG. 7B).

If the value of BuffSects 505 is greater than or equal to the value of SPB 504, then the Data Mover 500 sends an H_XferBlk 403 signal to the Host Interface 400 requesting that the Host Interface 400 transfer a block of data from the host 102 to the buffer 205, as indicated in step 705. After the H_XferBlk 403 signal is sent to the Host Interface 400, a block of data is transferred from the host 102 to the buffer 205 in step 706 and the Data Mover 500 receives an H_BlkXferred 404 signal from the Host Interface 400 confirming the data transfer. After the H_BlkXferred 404 signal is received by the Data Mover 500 from the Host Interface 400, the values of HXSC 502 and BuffSects 505 are decreased by the value of SPB 504, as indicated in step 707. In addition, if the value of Host_LW_Ptr 511 is equal to EOB_LW_Ptr 516, then the value of Host_LW_Ptr 511 is set equal to SOB_LW_Ptr 515.

The Data Mover 500 then determines in step 708 (FIG. 7B) if data sectors remain to be transferred to the Storage Medium 104 (FIG. 1); this determination is based on whether the value of DXSC 503 is greater than 0. If the value of DXSC 503 is not greater than 0, then the Storage Medium Interface 600 interrupts the microprocessor 201 in step 709 and the method 700 terminates in step 710. If, however, the value of DXSC 503 is greater than 0, then the Data Mover 500 determines in step 711 if there is at least one sector of data in the buffer 205; this determination is based on whether the value of BuffSects 505 is less than the value of MaxBuffSects 510.

If the value of BuffSects 505 is less than the value of MaxBuffSects 510, then the Data Mover 500 sends an SMI_XferSect 508 signal to the Storage Medium Interface 600 requesting that the Storage Medium Interface 600 transfer a sector of data from the buffer 205 to the Storage Medium 104, as indicated in step 712. However, if the value of BuffSects 505 is not less than the value of MaxBuffSects 510, then the method 700 returns to step 703 (FIG. 7A). After the Storage Medium Interface 600 receives an SMI_XferSect 508 signal, the Storage Medium Interface 600 transfers a sector of data from the buffer 205 to the Storage Medium 104, as indicated in step 713, and then sends an SMI_SectXferred 509 signal to the Data Mover 500 confirming the transfer. After the SMI_SectXferred 509 signal is received by the Data Mover 500, the value of DXSC 503 is decreased by 1 and the value of BuffSects 505 is increased by 1, as indicated in step 714. In addition, if the value of SMI_LW_Ptr 512 is equal to EOB_LW_Ptr 516, then the value of SMI_LW_Ptr 512 is set equal to SOB_LW_Ptr 515.

At step 715 (FIG. 7C), the Data Mover 500 determines if there is a runt block remaining to be transferred. A runt block is an amount of data that is less than the unit of data (e.g. block) that the host 102 uses in sending or receiving data to the Data Transfer System 200. The determination of whether a runt block remains to be transferred is based on whether the value of HXSC 502 is greater than 0. If the value of HXSC 502 is not greater than 0, then the method 700 proceeds to step 708 (FIG. 7B). If, however, the value of HXSC 502 is greater than 0, then the Data Mover 500 interrupts the microprocessor 201 in step 716. After being interrupted, the microprocessor 201 reloads SPB 504 with HXSC 502 and Host_LW_PerBlk 506 with a value equal to the value of HXSC 502 multiplied by the value of SMI_LW_PerSect 507 (i.e. Host_LW_PerBlk 506 is loaded with a value equal to the number of longwords remaining to be transferred). After SPB 504 and Host_LW_PerBlk 506 are reloaded, the method 700 returns to step 703 so that the runt block may be transferred. After the runt block is transferred, the microprocessor 201 reloads SPB 504 and Host_LW_PerBlk 506 with the values that they had prior to when the microprocessor 201 was interrupted in step 716. In one possible implementation, the microprocessor is not interrupted in step 716; instead, SPB 504 and Host_LW_PerBlk 506 are reloaded prior to the runt block transfer using a specialized circuit without microprocessor 201 intervention.

Figure 8A:
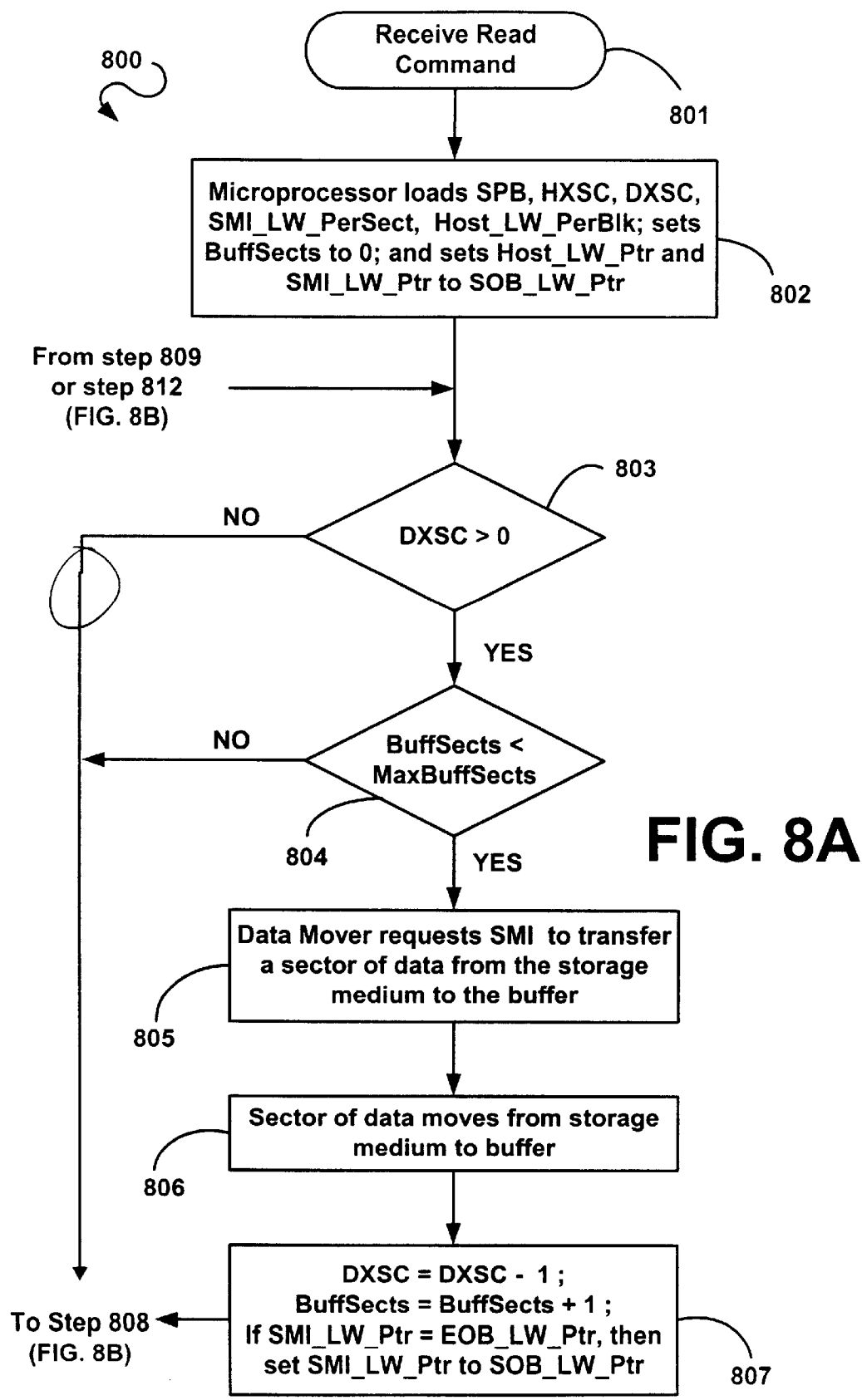
FIGS. 8A, 8B, and 8C are flow charts depicting a non-limiting example of a method for reading data from the storage medium depicted in FIG. 1 in accordance with an embodiment of the present invention.
Figure 8B:
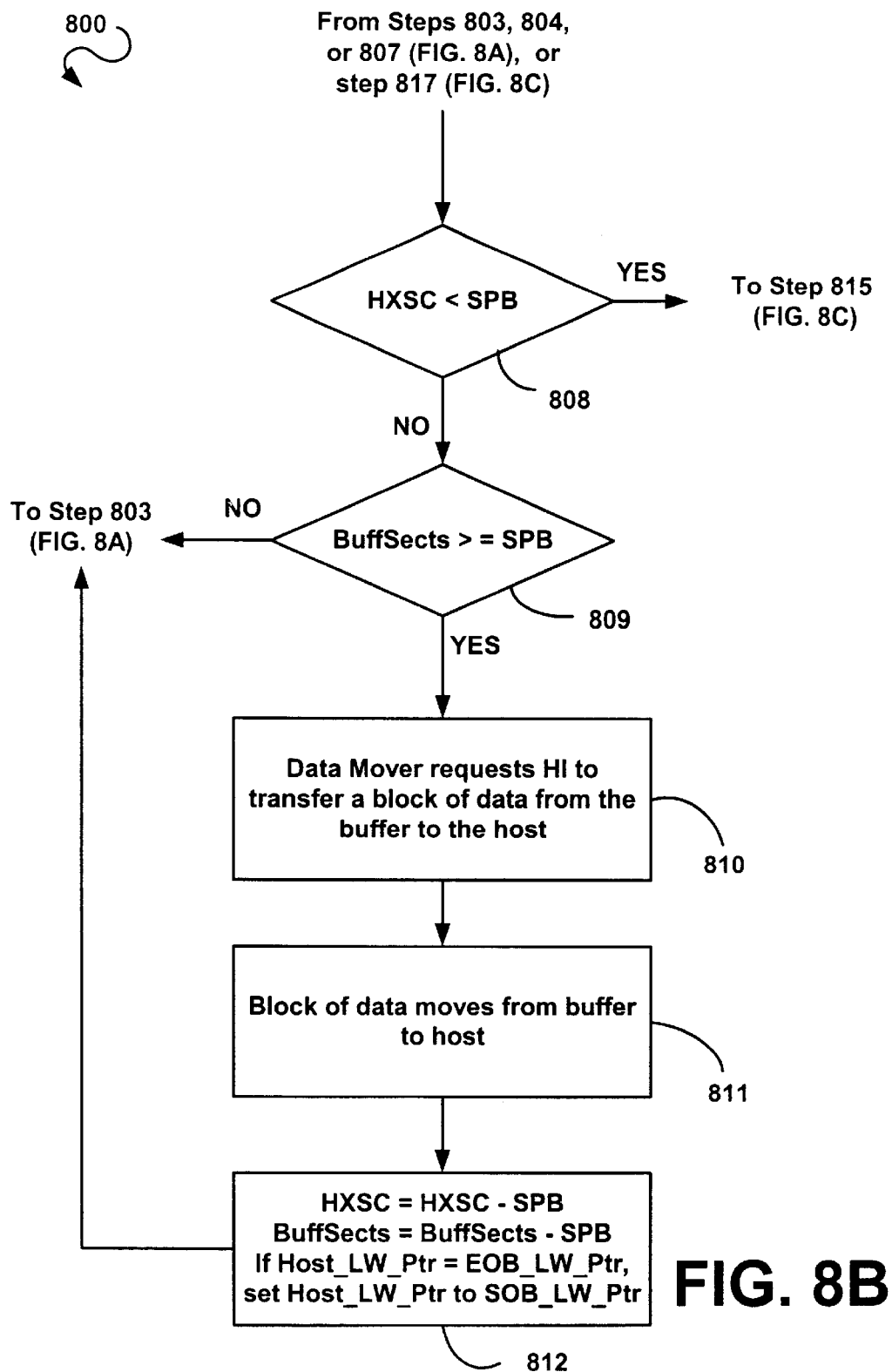
Figure 8C:
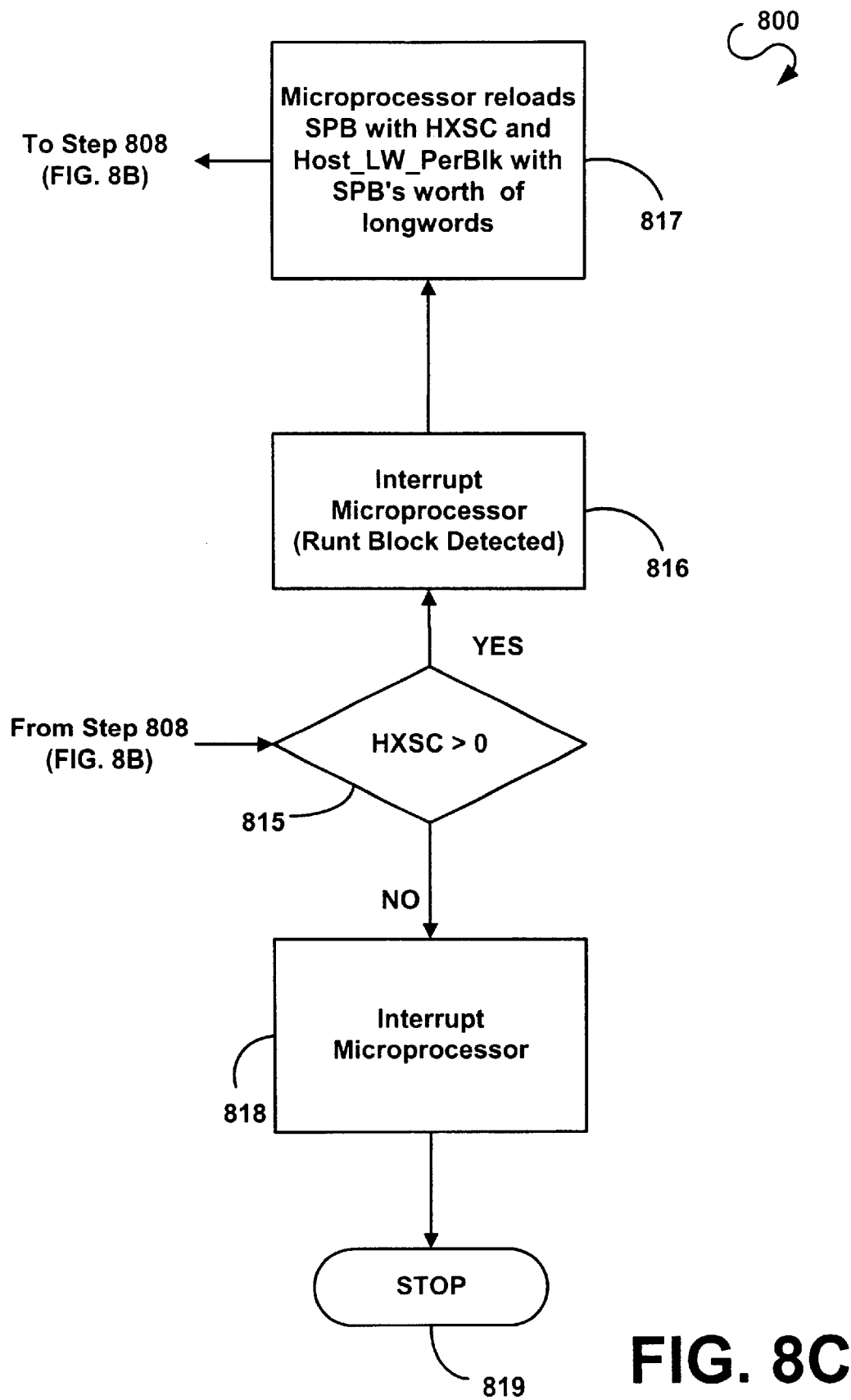

FIGS. 8A, 8B, and 8C are flow charts depicting a non-limiting example of a read method that is performed by the Data Transfer System 200 (FIG. 2) in accordance with one embodiment of the present invention. In step 801, the Host Interface 400 (FIG. 2) receives a read command from a host 102 (FIG. 1). In response to receiving the read command, the Host Interface 400 interrupts the microprocessor 201 (FIG. 2) which, in step 802, loads the number of sectors per block into SPB 504, the transfer length in sectors into HXSC 502 and DXSC 503, the number of longwords in a sector into SMI_LW_PerSect 507, and the number of longwords in a block into Host_LW_PerBlk 506. In addition, the Microprocessor 201 sets BuffSects 505 to 0, sets Host_LW_Ptr 511 and SMI_LW_Ptr 512 to SOB_LW_Ptr 515, and then activates the modules Host Interface 400, Data Mover 500, and Storage Medium Interface 600 (FIG. 2).

The Data Mover 500 then determines in step 803 if data sectors are to be received from the Storage Medium 104 (FIG. 1); this determination is based on whether the value of DXSC 503 is greater than 0. If the value of DXSC 503 is not greater than 0, then the method 800 proceeds to step 808 (FIG. 8B). If the value of DXSC 503 is greater than 0, then the Data Mover 500 determines in step 804 if there is space in the buffer 205 for receiving a sector of data from the Storage Medium 104; this determination is based on whether the value of BuffSects 505 is less than the value of MaxBuffSects 510.

If the value of BuffSects 505 is not less than the value of MaxBuffSects 510, then the method 800 proceeds to step 808. However, if the value of BuffSects 505 is less than the value of MaxBuffSects 510, then the Data Mover 500 sends an SMI_XferSect 508 signal to the Storage Medium Interface 600 requesting that the Storage Medium Interface 600 transfer a sector of data from the Storage Medium 104 to the buffer 205, as indicated in step 805. After the Storage Medium Interface 600 receives the SMI_XferSect 508 signal, the Storage Medium Interface 600 transfers a sector of data from the Storage Medium 104 to the buffer 205, as indicated in step 806, and then sends an SMI_SectXferred 509 signal to the Data Mover 500 confirming the transfer. After the SMI_SectXferred 509 signal is received by the Data Mover 500 from the Storage Medium Interface 600, the value of DXSC 503 is decreased by 1 and the value of BuffSects 505 is increased by 1, as indicated in step 807. In addition, if the value of SMI_LW_Ptr 512 is equal to EOB_LW_Ptr 516, then the value of SMI_LW_Ptr 512 is set equal to SOB_LW_Ptr 516.

Subsequently, in step 808 (FIG. 8B), the Data Mover 500 determines if the amount of data remaining to be transferred is less than a block's worth of data. This determination is based on whether the value of HXSC 502 is less than the value of SPB 504. If the value of HXSC 502 is less than the value of SPB 504, then the method 800 proceeds to step 815 (FIG. 8C). If, however, the value of HXSC 502 is not less than the value of SPB 504, then the Data Mover 500 determines in step 809 if there is at least 1 block's worth of data in the buffer 205; this determination is based on whether the value of BuffSects 505 is greater than or equal to the value of SPB 504. If the value of BuffSects 505 is not greater than or equal to the value of SPB 504, then the method 800 proceeds to step 803 (FIG. 5A). However, if the value of BuffSects 505 is greater than or equal to the value of SPB 504, then the Data Mover 500 sends an H_XferBlk 403 signal to the Host Interface 400 requesting that the Host Interface 400 transfer a block of data from the buffer 205 to the host 102, as indicated in step 810. After the H_XferBlk 403 signal is sent to the Host Interface 400, a block of data is transferred from the buffer 205 to the host 102 in step 811 and the Data Mover 500 receives an H_BlkXferred 404 signal from the Host Interface 400 confirming the data transfer. After the H_BlkXferred 404 signal is received by the Data Mover 500 from the Host Interface 400, the values of HXSC 502 and BuffSects 505 are decreased by the value of SPB 504, as indicated in step 812. In addition, if the value of Host_LW_Ptr 511 is equal to EOB_LW_Ptr 516, then the value of Host_LW_Ptr 511 is set to SOB_LW_Ptr 515. After the register values are adjusted in step 812, the method 800 returns to step 803 (FIG. 8A).

At step 815 (FIG. 8C), the Data Mover 500 determines if there is a runt block remaining to be transferred. The determination of whether a runt block remains to be transferred is based on whether the value of HXSC 502 is greater than 0. If the Data Mover 500 determines in step 815 that the value of HXSC 502 is not greater than 0, then the Data Mover 500 interrupts the microprocessor 201 in step 818 and the method 800 terminates in step 819. If, however, the value of HXSC 502 is greater than 0, then the Data Mover 500 interrupts the microprocessor 201 in step 816. After being interrupted, the microprocessor 201 reloads SPB 504 with HXSC 502 and reloads Host_LW_PerBlk 506 with a value equal to the value of HXSC 502 multiplied by the value of SMI_LW_PerSect 507 (i.e., Host_LW_PerBlk 506 is loaded with a value equal to the number of longwords remaining to be transferred). After SPB 504 and Host_LW_PerBlk 506 are reloaded, the method 800 returns to step 808 so that the runt block may be transferred. After the runt block is transferred, the microprocessor 201 reloads SPB 504 and Host_LW_PerBlk 506 with the values that they had prior to when the microprocessor 201 was interrupted in step 816. In one possible implementation, the microprocessor is not interrupted in step 816. Instead, SPB 504 and Host_LW_PerBlk 506 are reloaded prior to the runt block transfer using a specialized circuit without microprocessor 201 intervention.

In an alternative embodiment of the present invention, functions or steps shown in the flow charts depicted in FIGS. 7A, 7B, 7C, 8A, 8B, and 8C may be executed out of order from that shown or discussed, including substantially concurrently or in reverse order as would be understood by those reasonably skilled in the art.

It should be emphasized that the above-described embodiments of the present invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims.

What is claimed is:

1. A method for transferring data between a host device and a storage medium via a data transfer system having a buffer and a microprocessor, the method comprising:
receiving a command from the host device requesting a data transfer between the host device and the storage medium;
implementing a plurality of data phases between the host device and the storage medium without microprocessor intervention during the plurality of data phases; and
interrupting the microprocessor after the plurality of data phases are implemented.

2. The method of claim 1, further comprising:
storing in a first register a value for tracking a number of data units that are transferred between the buffer and the storage medium; and
storing in a second register a value for tracking a number of data units that are transferred between the host and the buffer.

3. The method of claim 2, further comprising:
initiating a transfer of a data unit between the buffer and the storage medium if the value in the first register is within a predetermined range;
modifying the value contained in the first register in response to the transfer of a data unit between the buffer and the storage medium;
initiating a transfer of a data unit between the buffer and the host if the value contained in the second register is within a predetermined range; and
modifying the value contained in the second register in response to the transfer of a data unit between the buffer and the host.

4. The method of claim 3, further comprising:
storing in a third register a value for tracking a number of data units that have been transferred into the buffer but that have not yet been transferred out of the buffer;
modifying the value contained in the third register in response to the transfer of a data unit between the buffer and the host; and
modifying the value contained in the third register in response to the transfer of a data unit between the buffer and the storage medium.

5. The method of claim 1, wherein at least one block of data is transferred between the host device and storage medium during each data phase.

6. The method of claim 1, wherein the storage medium comprises non-volatile semiconductor memory.

7. The method of claim 1, further comprising:
implementing the method via an application specific integrated circuit (ASIC).

8. The method of claim 1, further comprising:
storing in a register a value representing the buffer's storage capacity.

9. A data transfer system for transferring data between a host device and a storage medium, comprising:
a host interface that receives from a host device a command to transfer data between the host device and the storage medium;
a buffer that temporarily stores data that is transferred between the host device and the storage medium;
a first register that stores a value for tracking a number of data units that are transferred between the buffer and the storage medium, wherein a data unit is transferred between the buffer and the storage medium if the value in the first register is within a predetermined range, and wherein the value stored in the first register is modified in response to a transfer of a data unit between the buffer and the storage medium; and
a second register that stores a value for tracking a number of data units that are transferred between the host device and the buffer, wherein a data unit is transferred between the buffer and the host device if the value in the second register is within a predetermined range, and wherein the value stored in the second register is modified in response to a transfer of a data unit between the host device and the storage medium.

10. The data transfer system of claim 9, further comprising a third register that stores a value for tracking a number of data units that have been transferred into the buffer but that have not yet been transferred out of the buffer.

11. The data transfer system of claim 9, wherein the storage medium comprises non-volatile semiconductor memory.

12. The data transfer system of claim 9, wherein the data transfer system is an application specific integrated circuit (ASIC).

13. The data transfer system of claim 9, further comprising a register that stores a value representing the buffer's storage capacity.

14. A method for transferring data between a host device and a storage medium, comprising:
receiving from a host device a command to transfer data between the host device and the storage medium;
storing in a first register a value for tracking a number of data units that are transferred between a buffer and the storage medium;

storing in a second register a value for tracking a number of data units that are transferred between the host and the buffer;

initiating a transfer of a data unit between the buffer and the storage medium if the value in the first register is within a predetermined range;

modifying the value contained in the first register in response to the transfer of a data unit between the buffer and the storage medium;

initiating a transfer of a data unit between the buffer and the host if the value contained in the second register is within a predetermined range; and modifying the value contained in the second register in response to the transfer of a data unit between the buffer and the host.

15. The method of claim 14, wherein the host device is a computer and the storage medium comprises non-volatile semiconductor memory.

16. The method of claim 14, wherein the method is implemented via an application specific integrated circuit (ASIC).

* * * * *